US005271989A

United States Patent [19]

Mori et al.

[11] Patent Number: 5,271,989

[45] Date of Patent: Dec. 21, 1993

[54] RECORDING MEDIUM WITH RECORDING LAYER OF PVP, HYDROXY-CONTAINING RESIN AND CONDENSATION PRODUCT OF SORBITOL AND AROMATIC ALDEHYDE AND METHOD OF PRODUCING THE SAME

[75] Inventors: Takahiro Mori; Hiroshi Sato, both of Yokohama, Japan

[73] Assignee: Canon Kabushiki Kaisha, Tokyo, Japan

[21] Appl. No.: 763,320

[22] Filed: Sep. 20, 1991

[30] Foreign Application Priority Data

Sep. 28, 1990 [JP] Japan .................................. 2-260234

[51] Int. Cl.$^5$ .................................................. B32B 3/00

[52] U.S. Cl. .................................... 428/195; 428/206; 428/327; 428/412; 428/426; 428/476.3; 428/483; 428/500; 428/524; 346/135.1

[58] Field of Search ............... 428/195, 500, 483, 206, 428/524, 412, 426, 476.3, 327; 346/135.1

[56] References Cited

U.S. PATENT DOCUMENTS

| | | | |
|---|---|---|---|
| 4,550,053 | 10/1985 | Arai | 428/195 |
| 4,680,235 | 7/1987 | Murakami | 428/524 |
| 4,857,386 | 8/1989 | Butters | 428/206 |
| 5,002,825 | 3/1991 | Mimura | 428/315.5 |
| 5,139,868 | 8/1992 | Mori et al. | 428/327 |

FOREIGN PATENT DOCUMENTS 0380133 8/1990 European Pat. Off. .

*Primary Examiner*—Patrick J. Ryan
*Assistant Examiner*—Marie R. Macholl
*Attorney, Agent, or Firm*—Fitzpatrick, Cella, Harper & Scinto

[57] ABSTRACT

A recording medium has an ink-receiving layer of a condensation product of sorbitol with an aromatic aldehyde, polyvinylpyrrolidone and a resin, wherein the resin has a main component of a unit with hydroxyl group represented by a following Formula (I)

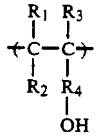

(I)

wherein $R_1$, $R_2$ and $R_3$ independently denote hydrogen or methyl; $R_4$ denotes a group represented by

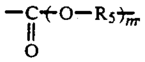

m is an integer of 1–20, $R_5$ denotes a group represented by $-C_lH_{2l}-$, l is an integer of 1–4.

18 Claims, No Drawings

RECORDING MEDIUM WITH RECORDING LAYER OF PVP, HYDROXY-CONTAINING RESIN AND CONDENSATION PRODUCT OF SORBITOL AND AROMATIC ALDEHYDE AND METHOD OF PRODUCING THE SAME

BACKGROUND OF THE INVENTION

Field of the Invention

The present invention relates to a recording medium suitable for ink-jet recording and also to a method of producing the same. In particular, the present invention relates to an ink jet recording medium with excellent recording and display properties, including characteristics of ink absorption, resistance to blocking, beading and bleeding, and long-term storage under elevated temperature. The present invention also relates to a method of producing the same.

Related Background Art

Ink-jet recording has attracted attention as a quiet recording method that operates at a high rate of speed and can perform multi-color printing.

Previous ink-jet recording media include commonly available paper, specialized ink-jet recording paper which comprises a substrate bearing a porous ink-receiving layer thereon and light-transmissive recording media intended for use in over-head projector (OHP) apparatus.

In recent years, performance of ink-jet recording apparatus has improved such that the recording is performed at a higher speed and in multiple colors. Therefore, higher levels of performance and even more extensive properties of the recording media are now widely required.

In particular, it is necessary for light-transmissive recording media to satisfy the fundamental requirements such that;

1) they have excellent light-transmissive properties;
2) they have excellent ink receptivity;
3) images, including filled-in ("full") dots, have a high optical density (O.D.);
4) they have excellent blocking resistance;
5) no beading is caused; and
6) no bleeding is caused.

The resin commonly contained in an ink-receiving layer swells when it absorbs a large amount of ink. The resin further dissolves and becomes sticky. As a result, an ink-receiving layer tends to adhere to paper and plastic film etc. This phenomenon is called blocking (4). Blocking resistance is especially required when a large amount of ink is suddenly imparted to a recording medium as when a recording head having plural ink ejection orifice (nozzles) is used, or when full color images are formed using multi-color inks.

Beading (5) refers to a phenomenon in which a large amount of ink is present on the surface of an ink-receiving layer, resulting in uneven optical density. In particular, the beading is especially noticed when large amounts of ink droplets are used, the ink droplet ejection frequency is high and/or when full color images are formed using multi-color inks. When beading occurs, it is difficult to obtain an image with high resolution.

Bleeding (6) refers to a phenomenon in which the edges, i.e., the boundaries of a printed area are blurred. Bleeding resistance is required when a large amount of ink is simultaneously applied to a recording medium as when full color images are formed using multi-color inks since it is necessary that the ink be promptly absorbed without significantly blurring the edges of the multi-color printed area.

Various studies have been conducted to achieve the performance levels discussed above and such performance criteria have been obtained to a lesser extent. However, no one recording medium is known that simultaneously satisfied all of these performance characteristics.

Previously, the materials which were used in ink-receiving layers of ink-jet recording media were intended to record images using water-based ink. These materials include natural hydrophilic resins such as albumin, gelatine, casein, starch, cationic starch, gum arabic, sodium alginate, etc; and water-soluble (or synthetic) hydrophilic resins such as polyvinyl alcohol, cation-modified polyvinyl alcohol, polyamide, polyacrylamide, polyvinyl pyrrolidone, quarternized polyvinyl pyrrolidone, poly (N-vinyl-3-methylpyrrolidone), polyvinyl imidazole, polyarylamine, polyarylamine chloride, polyethyleneimine, polyvinyl pyridinium halide, melamine resin, polyurethane, carboxymethyl cellulose, hydroxypropyl cellulose, cationic hydroxyethyl cellulose, hydroxypropyl cellulose, polyester, sodium polyarylate, etc. Generally, at least one natural hydrophilic, water-soluble or synthetic hydrophilic resins is included in the ink-receiving layer, although this commonly causes beading. Therefore, a high resolution image is not easily obtained when large amounts of ink are applied to the recording medium.

In part to address the problem of blocking when large amounts of ink are applied to a recording medium, U.S. Pat. No. 4,550,053 discloses a recording medium having an ink-receiving layer comprising 5–200 parts of a condensation product of D-sorbitol with benzaldehyde based on 100 parts of a water-soluble resin polymer material. In the '053 Patent, when the recording layer contains more than 70 parts of the condensation product based on 100 parts of a polymer material, blocking resistance is especially good. However, the water-soluble resin and the condensation product are not well-matched in solubility. Therefore, problems occur since the condensation product actually comes out the ink-receiving layer and whitens the recording medium when the recording medium is stored for a long time or under conditions of high temperature and high humidity.

The edges of printed areas are also whitened by the presence of water or water-based ink, as well as by alcohol or polyhydric alcohol, which are commonly contained in water-based ink.

U.S. Pat. No. 4,550,053 discloses the use as a base polymer of a hydroxyl group containing resin such as starch, gelatine, casein, gum arabic, sodium alginate, polyvinyl alcohol, polyvinyl butyral and polyvinylformal. However, the present inventors found that using starch, gelatine, casein, gum arabic, sodium alginate or polyvinyl alcohol in ink jet recording media results in poor wetting strength of an ink-receiving layer which has absorbed water-based ink, as well as reduced blocking resistance. On the other hand, polyvinyl butyral or polyvinylformal have a good affinity for ink, but yield a recording medium with poor reduced ink absorptivity, beading resistance and bleeding resistance. Therefore these resins are not suitable for the present invention.

Thus, it is seen that when a water-soluble resin is used in an ink-receiving layer (to improve ink absorptivity) and a non-water-soluble compound is added to an ink-receiving layer (to improve blocking resistance), it becomes important to determine how well molded are the solubilities of the materials. Accordingly, it has proved difficult to obtain a recording medium which simultaneously satisfies all the performance requirements including ink absorptivity, blocking resistance, beading resistance, bleeding resistance and storage stability.

SUMMARY OF THE INVENTION

Accordingly, an object of the present invention is to provide a recording medium that exhibits excellent ink absorptivity, blocking resistance, beading resistance and bleeding resistance even when a large amount of ink is applied in a high density.

An additional object of the present invention is to provide a method of producing a recording medium that exhibits excellent ink absorptivity, blocking resistance, beading resistance and bleeding resistance even when a large amount of ink is applied in a high density.

Another object of the present invention is to provide a recording medium that has an excellent long-term storage property, that maintains recorded images stably even after storage under elevated temperature conditions, and can provide highly transmissive recording medium for use with OHP.

An object of the present invention is also to provide a method of producing a recording medium that has an excellent long-term storage property, that maintains recorded images stably even after storage under elevated temperature conditions, and can provide a highly transmissive recording medium for use with OHP.

A further object of the present invention is to provide a recording medium that provides a printed matter with an excellent long-term storage property under conditions of high temperature and high humidity.

Another object of the present invention is to provide a method of producing a recording medium that provides a printed matter with an excellent long-term storage property under conditions of high temperature and high humidity.

These objects and others are provided according to the present invention, wherein a recording medium comprises a substrate and an ink-receiving layer provided thereon, wherein an ink-receiving layer contains a condensation product of sorbitol with an aromatic aldehyde, polyvinyl pyrrolidone and a resin comprising, as a main component, a unit with hydroxyl group represented by a following Formula [I].

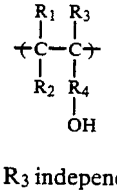

[I]

wherein $R_1$, $R_2$ and $R_3$ independently denote hydrogen or methyl; $R_4$ denotes a group represented by

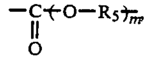

m is an integer of 1–20, $R_5$ denotes a group represented by $-C_lH_{2l}-$, l is an integer of 1–4.

The above objects are also provided by a method of producing a recording medium comprising the steps of:

dissolving a mixture of a condensation product of sorbitol with an aromatic aldehyde, polyvinylpyrrolidone and a resin comprising, as a main component, a unit with hydroxyl group represented by the following [I] in a common good solvent;

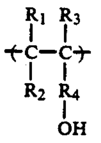

[I]

wherein $R_1$, $R_2$ and $R_3$ independently denote hydrogen or methyl; $R_4$ denotes a group represented by

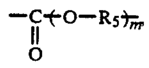

m is an integer of 1–20, $R_5$ denotes a group represented by $-C_lH_{2l}-$, l is an integer of 1–4;

coating a mixture solution on a substrate, followed by drying to form an ink-receiving layer;

immersing the ink-receiving layer in a solvent which is poor solvent to one or two of the above three compounds, but is a good solvent to the remaining compounds; and distilling off an immersed solvent from an ink receiving layer.

Additionally, the objects of the present invention are provided by another method of producing a recording medium comprising the steps of:

dissolving a mixture of a condensation product of sorbitol with an aromatic aldehyde, polyvinylpyrrolidone and a resin comprising, as a main component, a unit with hydroxyl group represented by the following Formula [I] in a solvent which is a poor solvent to one or two of the above three compounds, but which, upon heating, becomes a good solvent to the remaining compounds;

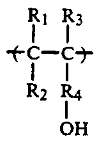

[I]

wherein $R_1$, $R_2$ and $R_3$ independently denote hydrogen or methyl; $R_4$ denotes a group represented by

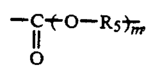

m is an integer of 1–20, $R_5$ denotes a group represented by $-C_lH_{2l}-$, l is an integer of 1–4;

coating a solution dissolved by heating on a substrate; and distilling off a solvent from a solution.

DETAILED DESCRIPTION OF PREFERRED EMBODIMENTS

The present invention is described in detail below. In the following, "parts" is intended to refer to "parts by weight," unless particularly mentioned otherwise.

The recording medium of the present invention comprises a substrate and an ink-receiving layer provided thereon. As the substrate, any conventional substrate including light-transmissive and opaque substrates can be used. Suitable substrates include, for example, films or sheets made of glass or resins such as polyester, diacetate, triacetate, acrylic, polycarbonate, polyvinyl chloride or polyamide, etc.

These substrate materials may preferably be light-transmissive.

The ink-receiving layer provided on the substrate comprises a mixture of (i) a condensation product of sorbitol with an aromatic aldehyde, (ii) polyvinylpyrrolidone and (iii) a resin containing a recurring unit with an hydroxyl group as a main component. In the recording layer, the condensation product improves blocking resistance, polyvinylpyrrolidone improves the absorbance of water-based inks and the resin improves the wetting strength of the ink-receiving layer after ink has been absorbed.

The condensation product of sorbitol with an aromatic aldehyde most commonly will use D-sorbitol due to their ready commercial availability. The aromatic aldehydes which are used include benzaldehyde, halogenated benzaldehyde, tolualdehyde, salicylaldehyde, cinnamaldehyde and naphthaldehyde. One condensation product of sorbitol with an aromatic aldehyde such as these may be used alone or alternatively, two or more condensation products may be used in combination. One particularly preferred condensation product is a condensation product of D-sorbitol with benzaldehyde, since benzaldehyde is readily available commercially and because the condensation product has a high gelation effect.

D-sorbitol and benzaldehyde may be synthesized easily by condensation. It is possible to synthesize condensation products comprising D-sorbitol and benzaldehyde in various molar ratios, including 1:1, 1:2 and 1:3 (D-sorbitol:benzaldehyde). It is preferred to use the condensation product of the molar ratio of 1:2 or 1:3, and most preferred to use the condensation product of the molar ratio of 1:2.

Of the condensation products of D-sorbitol with benzaldehyde, the product of the molar ratio of 1:2 is called dibenzylidene sorbitol (trade name: Gelall D; available from Shin-Nippon Chemical Industries, Co)., Ltd.) and the product of the molar ratio of 1:3 is called tribenzylidene sorbitol (trade name: Gelall T, available form Shin-Nippon Chemical Industries Co., Ltd.).

The most preferred dibenzylidene sorbitol is a chemically neutral compound, which shows a solubility of about 10% by weight in solvents such as n-methylpyrrolidone, N,N-dimethylformamide, and dimethyl sulfoxide. However, dibenzylidene sorbitol has a low solubility in most solvents, such as water, ethyl alcohol, isopropyl alcohol, ethylene glycol, glycerol, diethylene glycol, benzyl alcohol, ethyl cellosolve, tetrahydrofuran, dioxane, cyclohexylamine, aniline and pyridine.

These condensation products are preferably contained in the ink-receiving layer in an amount of 30 to 70 parts based on 100 parts of the ink-receiving layer to attain optimum properties including blocking resistance, film feed reliability under conditions of high temperature and high humidity, ink absorptivity, image quality and well-matched solubility of the condensation product in the ink-receiving layer. Generally, when less than 30 parts of condensation product are used, blocking resistance and film feed reliability may decrease. Similarly, when more than 70 parts of condensation product are used, ink absorptivity and image quality may decrease, due to poorly matching solubility of condensation product in ink-receiving layer.

The present inventors have determined that as higher molecular weights of polyvinylpyrrolidone are used, blocking resistance improves. Therefore, polyvinylpyrrolidone with a mean molecular weight of at least 100,000 is preferably used in the present invention. Polyvinylpyrrolidone may preferably be contained in an ink-receiving layer in an amount of 30–70 parts based on 100 parts of an ink-receiving layer to attain optimum properties including ink absorptivity, image quality, blocking resistance under high temperature and high humidity and film feed reliability. Generally, when less than 30 parts of polyvinylpyrrolidone are used, ink absorptivity and image quality may decrease due to a decrease in proportion of hydrophilic component.

Similarly, when more than 70 parts of polyvinylpyrrolidone are used, blocking resistance under high temperature and high humidity and film feed reliability within a recording apparatus may decrease.

The present invention further utilizes a resin containing a main recurring unit with hydroxyl group to improve the wetting strength of the ink-receiving layer when it has already absorbed water-based ink. In particular, the present invention utilizes the following resin compound represented by Formula [I] which provides improved ink-fixing time in addition to improved wetting strength and also results in solving the problem of reduced blocking resistance caused by using the water-soluble resin disclosed in U.S. Pat. No. 4,550,053.

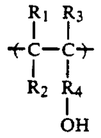

[I]

wherein $R_1$, $R_2$ and $R_3$ independently denote hydrogen or methyl; $R_4$ denotes a group represented by

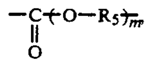

m is an integer of 1–20 and $R_5$ denotes a group represented by $—C_lH_{2l}—$, l is an integer of 1–4.

Herein, when m is greater than 20, light transmissiveness of the recording medium is reduced because of a poor affinity between the resin compound and other compounds present in the ink-receiving layer. When l is greater than 4, ink absorptivity is reduced and image quality becomes poor because the hydrophilicity of the resin represented by Formula (I) is reduced.

A resin containing, as a main component, a unit with hydroxyl group represented by Formula (I) includes, for example, poly-2-hydroxyethyl-(meth)acrylate, poly-2-hydroxypropoyl (meth)acrylate, polyethyleneglycol (meth)acrylate and polypropyleneglycol (meth)acrylate. The resin may include copolymer combined with each monomer constituting the above polymer, copolymer combined each monomer constituting the above polymer with methyl (meth)acrylate, ethyl (meth)acrylate, styrene, vinyl acetate and cyclohexyl (meth)acrylate for the purpose of adjusting hydrophilicity. The resin may preferably contain at least 50% of monomer represented by Formula [I].

For the purpose of improving the ability of the ink receiving layer to fix acid dyes, etc. and to improve waterfastness, it is also possible to use a copolymer comprising a monomer with primary to tertiary amino group.

In the present invention, a hydroxyl group value of the resin comprising a unit with hydroxyl group is preferably from 10 to 600, wherein the hydroxyl group value indicates the amount in mg of potassium hydroxide required to neutralize the amount of acetic acid necessary to acetylate 1 g of a sample. Thus, the hydroxyl group value is a measure of the number of hydroxyl groups in a sample. The hydroxyl group value is obtained by reacting a known sample of resin with excess acetic anhydride, and measuring the amount of acetic acid used in the reaction from the residual amount of acetic acid which remains.

A resin with a hydroxyl group value of 10–600 is preferred, since it results in further improved ink absorptivity (by increasing its affinity to water-based ink), wetting strength and blocking resistance.

Generally, when less than 10 of hydroxyl group value is used, ink absorptivity may decrease, due to reduced affinity to water-based ink. Similarly, when more than 600 of hydroxyl group value is used, wetting strength of ink-receiving layer and blocking resistance may decrease, due to excess hydrophilicity.

The resin represented by Formula [I] may preferably be contained in an ink-receiving layer in an amount of 3– 50 parts based on 100 parts of an ink-receiving layer depending on its hydroxyl group value. Use of from 3–50 parts of the resin results in improved wetting strength, improved apparent ink-fixing time, ink absorptivity, image quality and blocking resistance.

Generally, when less than 3 parts of the resin are used, ink-fixing time may not be improved, due to reduced wetting strength. Similarly, when more than 50 parts of the resin are used, ink absorptivity, image quality and blocking resistance may decrease.

It is also possible to noticeably improve bleeding resistance by incorporating a surfactant, preferably a fluorine-containing surfactant, in the recording medium of the present invention. The fluorine-containing surfactant may be selected from anionic, cationic, nonionic and ampholytic types such as those having a perfluoroalkylcarboxyl group, perfluoroalkylphosphate ester, perfluoroalkyltrimethylammonium salt, perfluoroalkylbetaine and perfluoroalkyl ethyleneoxide additives, etc. The surfactant may preferably be contained in the ink-receiving layer in an amount of 0.01 to 10 parts based on 100 parts of the ink-receiving layer. Generally, when less than 0.01 parts of surfactant are used, blocking resistance may not be improved. Similarly, when more than 10 parts of surfactant are used, surfactant may come out of the ink-receiving layer during storage after long-term or under high temperature, due to poor matched in solubility of surfactant in ink-receiving layer.

Further, it is also possible to include particles having a mean diameter of 3–30 $\mu m$ within the ink-receiving layer to noticeably improve the feed reliability of the recording medium and/or its blocking resistance. These particles may preferably be included within the ink receiving layer in an amount of 0.3–3 parts based on 100 parts of an ink-receiving layer, depending upon the particular conveyance system of the recording apparatus in which the recording medium is intended to be used and the extent of blocking resistance required.

The recording media of the present invention can be formed using the main materials as described above, however is by no means limited to these embodiments. That is, the ink-receiving layer may contain, for example, another surfactant, particles and other kinds of additives which are commonly used in producing a recording medium. Thus, the ink-receiving layer may contain all sorts of known additives such as dispersants, fluorescent dyes, pH adjusters, anti-foaming agents, lubricants and antiseptics.

There are two preferred methods in producing a recording medium of the present invention. One such method is by dissolving a mixture of the condensation product of sorbitol with aromatic aldehyde, polyvinylpyrrolidone and the resin used in the present invention in a first common good solvent, and coating the resulting solution on a substrate, followed by drying to form an ink-receiving layer. The ink receiving layer is then immersed in a second solvent which is a poor solvent to one (or two) of the above three compounds, but which is a good solvent to the remaining two (or one) of the above three compounds, followed by distillation of the second solvent to produce an ink-receiving layer. By this method, a mixture containing the three compounds is dissolved in a common good solvent at a certain proportion, coated on a substrate and dried to produce an origin of an ink-receiving layer. The present inventors have found that the three compounds of the ink-receiving layer may be rather segregated after the good solvent is dried. That is, although the three compounds are all soluble in the good solvent, due to their different individual solubilities, they still separate as the layer dries. Accordingly, the three compounds are not homogeneously distributed in the ink-receiving layer after the first solvent is evaporated. However, use of the poor solvent enables the present invention to re-distribute uniformly in the ink receiving layer the one (or two) of the three compounds which are soluble in the poor solvent. The thickness of an ink-receiving layer may be 1 to 100 $\mu m$, preferably 2 to 30 $\mu m$.

By this method, it is found that two or more organic compounds having different solubility are stably maintained in an apparent dissolved state for a long time, to achieve an ink-receiving layer with excellent ink absorptivity and image quality.

The good solvent mentioned refers to a solvent capable of dissolving at least 10 g of one of the three compounds used in the ink-receiving layer of the present invention at 25° C. The poor solvent refers to a solvent capable of dissolving no more than 1 g of such compound at 25° C.

In the present invention, any solvents which satisfy the above condition may be used. But taking evaporation speed into consideration, solvents having a boiling point of less than 200° C. may be preferred. Namely, solvents having a boiling point of greater than 200° C. require the use of a heat source in the final drying step and therefore restrict the choices of materials that can be used in an ink-receiving layer or a substrate to various heat-resistant materials. The first common good solvents preferably used in the present invention include dimethylformaldehyde. N-methylpyrrolidone, cyclohexanone, N,N-dimethylacetamide, dimethylsulforide and hexamethylphosphotriamide. Among these solvents, dimethylformaldehyde is the most preferable.

The second solvents preferably used in the present invention include water, alcohols such as ethyl alcohol, isopropyl alcohol, N-propyl alcohol, butanol; aromatic solvents such as benzene, toluene and xylene; ketones such as acetone, methylethylketone and methylisobutyl ketone; esters such as ethyl acetate and butyl acetate; halogenized hydrocarbons such as methyl chloride, dichloromethane and chloroform; nitrogen-containing solvents such as aniline and N,N-dimethylformamide.

The solvent which has the most varying solubility towards the three compounds used in the ink-receiving layer is water. Water also has excellent properties including evaporation pressure, boiling point and non-toxicity. It is also possible to add lower alcohols, etc. in water to lower the surface tension of water and thereby better uniformly add the water as a solvent on an ink-receiving layer. When an aqueous solvent is used, the water content is preferably at least 50% by weight based on the total weight of solvent.

The present inventors have found that when less than 50% by weight of water is used in an aqueous solvent, the solvent may exhibit an insufficient dissolving ability and an undesirable evaporation speed.

The second solvent will preferably penetrate an ink-receiving layer at least about 0.1 g/m$^2$ (about 0.1 μm in thickness). The temperature of drying the solvent impregnated into an ink-receiving layer is preferably at least 50° C. Use of water-based solvent which contains at least 50% by weight water requires a drying condition of at least 50° C. Generally, using a drying condition of less than 50° C. may make it difficult to redissolve the phase-separated organic compounds in an ink-receiving layer and an ink-receiving layer opaque after drying, such that the resultant recording medium may not be suitable for OHP.

Since the temperature depends on both the boiling point and evaporation pressure of the treating solvent, higher temperature may be effective in causing the change of well matched solubility in an ink-receiving layer. However, drying the solvent at extremely high temperatures may not provide all the desirable attributes of the present invention.

As methods of physically forming the ink-receiving layer, one preferred method is to dissolve or disperse a mixture of the above three compounds and applying the resultant coating solution on a substrate, which may be light-transmissive. The solution is spread by known methods such as roll coating, rod bar coating, spray coating or air-knife coating and it is thereafter dried. Methods of applying the poor solvent on the ink receiving layer include rod bar coating, spray coating, air-curtain method or dipping method.

The second method of producing a recording medium of the present invention includes selecting a solvent which is poor for one (or two) compounds of the above three compounds at room temperature, but which is a good solvent to the remaining two (or one) compounds heated to 50°-150° C., dissolving the mixture of the three compounds in the heated solvent, coating the mixture on the substrate and drying.

Preferred solvents include water, ethyl alcohol, N-propyl alcohol, butanol, 2-ethyl hexanol, benzyl alcohol, ethylene glycol, diethylene glycol, methyl cellosolve, ethyl cellosolve, butyl cellosolve, dioxane, morphorin, pyridine, cyclohexyl amine, aniline, nitrobenzene, sulforan, tetrahydrofuran, formamide, methyl ethyl ketone and dioctyl phthalate.

The recording medium of the present invention may not necessarily be colorless and may include colored recording media. The recording medium by this method can also use a light-transmissive substrate to provide a light-transmissive recording medium having a light-transmissive property. Sufficient light-transmissive properties are obtained means that the recording medium has a haze of not more than 50%, preferably not more than 20%. If the haze is not more than 50%, it is possible to easily view recorded images by projecting them on a screen and clearly observe details of the recorded images.

Thus, the ink-receiving layer may contain all sorts of known additives such as dispersants, fluorescent dyes, pH adjusters, anti-foaming agents, lubricants and antiseptics.

The recording medium of the present invention as described above has a superior ink absorptivity and can give recorded images with a superior clearness. It is therefore possible to record both monochromatic images and full-colored images effectively without any phenomenon in which an ink flows out or exudes, even when inks with different colors are applied at the same area overlapping over a short time.

The present invention is described below in more detail by giving Examples. It is however, to be understood that the present invention is not restricted to these Examples.

EXAMPLES

Using the four kinds of inks identified below, ink-jet recording was conducted on each recording medium of the following Examples and Comparative Examples using a recording apparatus comprising a bubble jet recording head (Canon model BJC-440) in which inks form bubbles upon the application of heat energy and thereby displace ink droplets and eject the same from an orifice. The recordings were evaluated and the results given in Table 1 below.

| | |
|---|---|
| The head has a following property: | |
| ejected droplet volume | 24 pl |
| head density | 16 pel/mm |
| maximum ejected amount of each ink | 6 nl/mm$^2$ |
| maximum number of overlapping colors | 3 |
| ejection frequency | 4 KHz |
| Yellow ink (composition) | |
| C.I. Acid Yellow 23 | 3% by weight |
| Diethylene glycol | 15% by weight |
| Water | 82% by weight |
| Cyan ink (composition) | |
| C.I. Acid Red 35 | 3% by weight |
| Diethylene glycol | 15% by weight |
| Water | 82% by weight |
| Magenta ink (composition) | |
| C.I. Direct Black 19 | 3% by weight |
| Diethylene glycol | 15% by weight |
| Water | 82% by weight |
| Black ink (composition) | |
| C.I. Direct Black 19 | 3% by weight |
| Diethylene glycol | 15% by weight |
| Water | 82% by weight |

The evaluations in Table 1 were made in the following manner.

(1) Haze was measured using a direct-reading haze meter (available from Toyo Seiki Seisaku Sho) having an optical system based on JISK 6714.

(2) Ink absorptivity was evaluated by recording full-dots of yellow, cyan and magenta on a recording medium, exposing the recording medium to warm air (100° C., wind velocity: 1 m/sec.) for 10 seconds and then evaluating whether or not ink adhered to fingers when the recorded image was lightly touched. A medium in which ink did not adhere to fingers was evaluated as A; a medium in which ink did adhere to fingers was evaluated as C; a product intermediate between these (wherein a smaller amount of ink adhered to fingers) was evaluated as B.

(3) The blocking resistance was evaluated by recording full-dots of yellow, cyan and magenta on a recording medium, exposing the recording medium to warm air (100° C. wind velocity: 1 m/sec.) for 10 seconds and then laminating polyethylene terephthalate (PET) film against the ink-receiving layer at a pressure of 40 g/cm$^2$. A product in which the ink-receiving layer and the PET film were easily peelable was evaluated as A; a product in which a large force for peeling is required, as C, a product intermediate between these was evaluated as B.

(4) The beading resistance was visually judged on full-dots of two colors of yellow, cyan and magenta. A product in which no beading occurred was evaluated as A, a product in which beading occurred was evaluated as C, and a product intermediate between these was evaluated as B.

(5) The bleeding resistance was visually judged on boundary edges of full dots of two colors of red, green and blue. A product in which no bleeding occurred was evaluated as A, a product in which bleeding occurred was evaluated as C and a product intermediate between these (wherein some bleeding occurred) was evaluated as B.

(6) The transmissiveness of the film after storage under high temperature and high humidity was measured using the same haze meter as in (1) by recording full dots of yellow, cyan and magenta on the films and exposing the recorded films to conditions of 35° C. and 90% RH for 100 hours. Product in which no whiteness was observed around the printed area was evaluated as A, a product in which whiteness occurred but did not interfere with projection by OHP was evaluated as B and a product in which whiteness occurred but was projected black by OHP was evaluated as C.

(7) The haze after storage under high temperature and high humidity was measured by placing the recording media in aluminum-laminated polyethylene bags, sealing the bags and storing the bags was under conditions of 60° C. and 90% RH for 200 hours. Haze was then measured in such a manner as (1).

EXAMPLE 1

Synthesis of Solution of Resin Containing a Unit With a Hydroxyl Group as a Main Component In three-neck flask were placed 500 parts of 2-hydroxyethyl-methacrylate and 500 parts of dimethylformaldehyde (DMF), followed by stirring to homogeneity. Nitrogen gas was injected into the solution, and the solution was heated at 73° C. 504 g of 0.2% DMF solution of azobisisobutylnitrile was added dropwise at a rate of 2.1 g/min using a measuring pump for 4 hours. While nitrogen gas was injected into the solution, the solution was stirred for 20 hours at 73° C. for polymerization. The resultant resin solution P was sticky and a hydroxyl group value was 420.

Production of a Recording Medium

A polyethylene terephthalate film (trade name: Lumirror T-100; available from Toray Industries, Inc.) of 100 mm thickness was used as a substrate. On the film, a following coating solution A was coated using a bar coater, so as to have a basis weight of 6 g/m$^2$ after drying, followed by drying under conditions of 140° C. for 5 minutes. Further, a following coating solution B was coated on the ink-receiving layer, so as to have a basis weight of 30 g/m$^2$, followed by standing for 5 sec at room temperature and then drying the solvent under conditions of 100° C. for 10 minutes.

| | |
|---|---|
| <coating solution A> | |
| 1,3,2,4-dibenzylidene-D-sorbitol (trade name: Gelall D; available from Shin-Nippon Chemical Industries, Co., Ltd.) | 40 parts |
| poly-N-vinyl-2-pyrrolidone (trade name: K-90; available from GAF) | 60 parts |
| resin solution P (solid content of 33%) | 18.1 parts |
| cross-linked resin particle (polystyrene) (trade name: PB-3011E, mean diameter: 11 μm; available from Sumitomo Chemical) | 1 part |
| DMF | 600 parts |
| <coating solution B> | |
| perfluoroalkylbetaine (trade name: Surflon S 131, solid content of 30%, available from Ashahi glass) | 0.33 parts |
| isopropyl alcohol | 10 parts |
| deionized water | 90 parts |

EXAMPLE 2

Synthesis of Solution of Resin Containing a Unit With a Hydroxyl Group as a Main Component In the three-neck flask were placed 250 parts of 2-hydroxyethylmethacrylate, 250 parts of 2-hydroxypropylmethacrylate and 500 parts of DMF, followed by stirring to homogeneity. Sticky resin solution Q was then obtained in the same manner as in Example 1. The resultant resin had a hydroxyl group value of 400.

Production of a Recording Medium

The same polyethylene terephthalate film of 100 mm thick as in Example 1, was used as a substrate. On the film, a following coating solution C was coated using a bar coater, so as to have a basis weight of 5 g/m$^2$ after drying, followed by drying under conditions of 140° C. for 5 minutes. Further, a following coating solution D was coated on the ink-receiving layer, so as to have a basis weight of 30 g/m$^2$, followed by standing for 5 sec at room temperature and drying the solvent under conditions of 60° C. for 15 minutes.

| | |
|---|---|
| <coating solution C> | |
| 1,3,2,4-dibenzylidene-D-sorbitol | 40 parts |
| poly-N-vinyl-2-pyrrolidone | 60 parts |
| resin solution Q (solid content of 33%) | 30 parts |
| glass particle (trade name: GB-210, mean diameter: 19 μm; available from Toshiba Balotini) | 1 part |
| DMF | 600 parts |

-continued

| | |
|---|---|
| <coating solution D> | |
| perfluoroalkylethyleneoxide additive (trade name: Surflon S 145; solid content of 30%; available from Asahi glass) | 1 part |
| isopropyl alcohol | 5 parts |
| deionized water | 95 parts |

EXAMPLE 3

Synthesis of Solution of Resin Containing a Unit With a Hydroxyl Group as a Main Component In the three-neck flask were placed 200 parts of diethyleneglycol monomethacrylate, 200 parts of 2-hydroxyethylacrylate, 100 parts of diethylaminoethylmethacrylate and 500 parts of DMF, followed by stirring to homogeneity. Sticky resin solution R was obtained by operating in the same manner as in Example 1. The resultant resin had a hydroxyl group value of 320.

Production of a Recording Medium

The same polyethylene terephthalate film of 100 mm thick as in Example 1 was used as a substrate. On the film, a coating solution E was coated using a bar coater, so as to have a basis weight of 6 g/m$^2$ after drying, followed by drying under conditions of 140° C. for 5 minutes. Further, a following coating solution F was coated on the ink-receiving layer, so as to have a basis weight of 50 g/m$^2$, followed by standing at room temperature for 5 sec and drying the solvent under conditions of 100° C. for 10 min.

| | |
|---|---|
| <coating solution E> | |
| 1,3.2,4-dibenzylidene-D-sorbitol | 50 parts |
| poly-N-vinyl-2-pyrrolidone | 50 parts |
| resin solution R (solid content of 33%) | 60 parts |
| cross-linked resin particle (trade name: PB-3011E; available from Sumitomo Chemical | 2 parts |
| DMF | 600 parts |
| <coating solution F> | |
| sodium triethyleneoxidealkyletheracetate (trade name: ECT-3NEX; available from Nikko Chemicals) | 0.2 parts |
| | 0.2 parts |
| ethyl alcohol | 15 parts |
| deionized water | 85 parts |

EXAMPLE 4

A recording medium was obtained in the same manner as in Example 1 except that the cross-linked resin particle was not used.

EXAMPLE 5

A recording medium was obtained in the same manner as in Example 1 except that the surfactant containing fluorine was not used.

EXAMPLE 6

A recording medium was obtained in the same manner as in Example 1 except that a coating solution B was not used.

EXAMPLE 7

As a substrate, the same polyethylene terephthalate film of 100 μm thick as in Example 1 was used. A coating solution G was dissolved by heating at 80° C. and was coated on the film using a bar coater, so as to have a basis weight of 6 g/m$^2$ after drying, followed by drying under conditions of 140° C. for 5 min.

| | |
|---|---|
| <coating solution G> | |
| 1,3.2,4-dibenzylidene-D-sorbitol | 40 parts |
| poly-N-vinyl-2-pyrrolidone | 60 parts |
| resin solution P (solid content of 33%) | 30 parts |
| cross-linked resin particle (trade name: PB-3011E; available from Sumitomo Chemical | 1 part |
| perfluoroalkylbetaine | 0.33 parts |
| (trade name: Surflon S 131; solid content of 30%; available from Asahi glass) | 0.33 parts |
| methylcellosolve | 1000 parts |

EXAMPLE 8

A recording medium was obtained in the same manner as in Example 7 except that the surfactant containing fluorine was not used.

COMPARATIVE EXAMPLE 1

As a substrate, the same polyethylene terephtalate film of 100 μm thick as in Example 1 was used. On the film, a following coating solution H was coated using a bar coater, so as to have a basis weight of 6 g/m$^2$ after drying, followed by drying under conditions of 140° C. for 5 min.

| | |
|---|---|
| <coating solution H> | |
| 1,3.2,4-dibenzylidene-D-sorbitol | 40 parts |
| poly-N-vinyl-2-pyrrolidone | 60 parts |
| DMF | 600 parts |

COMPARATIVE EXAMPLE 2

The coating solution B used in Example 1 was coated on a recording medium obtained by Comparative Example 1, so as to have a basis weight of 30 g/m$^2$ after drying, followed by standing at room temperature for 5 sec and drying the solvent under conditions of 100° C. for 10 min.

COMPARATIVE EXAMPLE 3

As a substrate, the same polyethylene terephthalate film as in Example 1 was used. On the film, a following coating solution I was coated using a bar coater, so as to have a basis weight of 6 g/m$^2$ after drying, followed by drying under conditions of 140° C. for 5 min.

Further, the coating solution B used in Example 1 was coated on the ink-receiving layer, so as to have a basis weight of 30 g/m$^2$, followed by leaving to stand at room temperature for 5 sec. and drying the solvent under conditions of 100° C. for 10 min.

| | |
|---|---|
| <coating solution I> | |
| 1,3.2,4-dibenzylidene-D-sorbitol | 40 parts |
| poly-N-vinyl-2-pyrrolidone | 60 parts |
| polyvinyl butyral (trade name: Eslec BL-S; available from Sekisui Chemical) | 6 parts |
| DMF | 600 parts |

COMPARATIVE EXAMPLE 4

As a substrate, the same polyethylene terephthalate film of 100 μm thick as in Example 1 was used. On the film, the coating solution H used in Comparative Example 1 was coated using a bar coater, so as to have a basis weight of 6 g/m$^2$, followed by drying under conditions of 140° C. for 5 min.

Furthermore, a following coating solution K was coated on the ink-receiving layer so as to have a basis weight of 30 g/m$^2$, after drying, followed by standing at room temperature for 5 sec. and drying the solvent under conditions of 100° C. for 10 min.

| <a coating solution K> | |
|---|---|
| polyvinyl alcohol (trade name: Poval 105; available from Kurarey) | 1.2 parts |
| isopropyl alcohol | 5 parts |
| deionized water | 95 parts |

TABLE 1

| | Examples | | | | | | | | Comparative Examples | | | |
|---|---|---|---|---|---|---|---|---|---|---|---|---|
| | 1 | 2 | 3 | 4 | 5 | 6 | 7 | 8 | 1 | 2 | 3 | 4 |
| haze | 4 | 3 | 6 | 3 | 4 | 4 | 5 | 5 | 3 | 3 | 3 | 3 |
| ink absorptivity | A | A | A | A | A | A | A | A | B | A~B | B | A |
| blocking resistance | A | A | A | A | A | A | A | A | B | A | A | B |
| beading resistance | A | A | A | A | A | A | A | A | B | A | B | A |
| bleeding resistance | A | A | A~B | A | B | A | A | B | C | B | A | B |
| transparency of film* | 4 | 4 | 7 | 3 | 4 | 21 | 5 | 5 | 57 | 4 | 3 | 4 |
| transparency of printed matter* | A | A | A | A | A | B | A | A | C | A | A | A |
| haze of film** | 4 | 4 | 6 | 3 | 4 | 16 | 5 | 6 | 21 | 4 | 4 | 4 |
| conveyance property*** | A | A | A | B | A | B | A | A | B | B | A | A |

*Transparency after storage under high temperature and high humidity
**Haze after storage under high temperature
***Conveyance property in a recording apparatus under a high temperature and high humidity According to the present invention, it is possible to provide recording media that has an excellent ink absorptivity, blocking resistance, beading resistance and bleeding resistance in forming a full-color image and which and has an excellent long-term storage property at high temperature, as well as novel methods of producing the same.

What is claimed is:

1. A recording medium comprising a substrate and an ink-receiving layer provided thereon, said ink-receiving layer comprising (i) a condensation product of sorbitol with an aromatic aldehyde, (ii) polyvinylpyrrolidone and (iii) a resin, said resin comprising a unit with hydroxyl group represented by the following Formula (I)

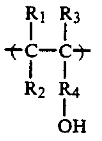

(I)

as a main component, wherein $R_1$, $R_2$ and $R_3$ independently denote hydrogen or methyl; $R_4$ denotes a group represented by

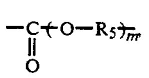

m is an integer of 1-20, $R_5$ denotes a group represented by $-C_lH_{2l}-$, l is an integer of 1-4.

2. A recording medium according to claim 1, wherein said substrate comprises glass or resin.

3. A recording medium according to claim 2, wherein said substrate is a resin selected from the group consisting of polyester, diacetate, triacetate, acrylic, polycarbonate, polyvinyl chloride and polyamide.

4. A recording medium according to claim 1 wherein said condensation product is contained in said ink-receiving layer in amounts of from about 30 to about 70 parts based on 100 parts of the ink receiving layer.

5. A recording medium according to claim 4, wherein said aromatic aldehyde is at least one selected from the group consisting of benzaldehyde, halogenated benzaldehyde, tolualdehyde, salicylaldehyde, cinnamaldehyde and naphthaldehyde.

6. A recording medium according to claim 5, wherein said aromatic aldehyde is benzaldehyde.

7. A recording medium according to any of claims 1, 5 or 6, wherein said sorbitol is D-sorbitol.

8. A recording medium according to claim 6, wherein said aromatic aldehyde is benzaldehyde and said condensation product is from about 1:1 to about 1:3 D-sorbitol:benzaldehyde.

9. A recording medium according to claim 8 wherein said condensation product is from about 1:2 to about 1:3 D-sorbitol:benzaldehyde.

10. A recording medium according to claim 9 wherein said condensation product is about 1:2 D-sorbitol: benzaldehyde.

11. A recording medium according to any of claims 1, 4 or 5 wherein said polyvinylpyrrolidone has a mean molecular weight of at least about 100,000.

12. A recording medium according to claim 11, wherein said polyvinylpyrrolidone is contained in said ink receiving layer in amounts of from about 30 to about 70 parts based on 100 parts of the ink receiving layer.

13. A recording medium according to any of claims 1, 4, or 5 wherein said resin contains at least 50% of the monomer represented by Formula (I).

14. A recording medium according to claim 13, wherein said resin has a hydroxyl group value of from about 10 to about 600.

15. A recording medium according to claim 14, wherein said resin is contained in said ink receiving layer in amounts of from about 3 to about 50 parts based on 100 parts of the ink receiving layer.

16. A recording medium according to any of claims 1, 4 or 5 wherein the ink-receiving layer comprises a surfactant.

17. A recording medium according to claim 16, wherein the surfactant is a fluorine-containing surfactant.

18. A recording medium according to any of claims 1, 4 or 5, wherein said ink-receiving layer comprises particles selected from at least one of resin and glass having a mean diameter of 3-30 μm, said particles being contained in said ink receiving layer from amounts of about 0.3-3 parts based on 100 parts of the ink-receiving layer.

* * * * *

UNITED STATES PATENT AND TRADEMARK OFFICE
CERTIFICATE OF CORRECTION

PATENT NO. : 5,271,989 Page 1 of 3

DATED : December 21, 1993

INVENTOR(S) : Mori et al.

It is certified that error appears in the above-indentified patent and that said Letters Patent is hereby corrected as shown below:

COLUMN 1:

Line 54, "orifice" should read --orifices--.

COLUMN 2:

Line 15, "gelatine," should read --gelatin,--;
Line 27, "resins" should read --resin--;
Line 45, "out" should read --out of--;
Line 56, "gelatine," should read --gelatin,--; and
Line 66, "reduced" should be deleted.

COLUMN 3:

Line 51, "a" should read --the--; and "[I]." should read --[I]--.

COLUMN 4:

Line 7, "[I]" should read --Formula [I]--; and
Line 30, "poor" should read --a poor--.

COLUMN 6:

Line 68, "copolymer" should read --a copolymer--.

COLUMN 7:

Line 64, "poor matched" should read --a poor match--.

UNITED STATES PATENT AND TRADEMARK OFFICE

CERTIFICATE OF CORRECTION

PATENT NO. : 5,271,989

DATED : December 21, 1993

INVENTOR(S) : Mori et al.

It is certified that error appears in the above-indentified patent and that said Letters Patent is hereby corrected as shown below:

COLUMN 8:

Line 10, "is" should read --it is--.

COLUMN 9:

Line 1, "dimethylformaldehyde." should read --dimethylformaldehyde,--;
Line 37, "opaque" should read --becomes opaque--; and
Line 62, "heated" should read --when heated--.

COLUMN 10:

Line 43, "given" should read --are given--.

COLUMN 11:

Line 60, "three-neck" should read --a three-neck--.

COLUMN 12:

Line 41, "the" should read --a--.

COLUMN 13:

Line 13, "the" should read --a--;
Line 40, "Chemical" should read --Chemical)--; and
Line 44, "0.2 parts" (second occurrence in Table) should be deleted.

UNITED STATES PATENT AND TRADEMARK OFFICE

CERTIFICATE OF CORRECTION

PATENT NO. : 5,271,989 Page 3 of 3

DATED : December 21, 1993

INVENTOR(S) : Mori et al.

It is certified that error appears in the above-indentified patent and that said Letters Patent is hereby corrected as shown below:

COLUMN 14:

Line 10, "Chemical" should read --Chemical)--; and
Line 13, "0.33 parts" (second occurrence in Table) should be deleted.

COLUMN 15:

Line 11, "<a coating" should read --<coating--; and
Line 14, "Kurarey" should read --Kuraray--.

COLUMN 16:

Line 3, "claim 1" should read --claim 1,--;
Line 34, "claim 8" should read --claim 8,--;
Line 37, "claim 9" should read --claim 9,--;
Line 41, "5" should read --5,--;
Line 48, "5" should read --5,--; and
Line 58, "5" should read --5,--.

Signed and Sealed this

Twenty-sixth Day of July, 1994

*Attest:*

BRUCE LEHMAN

*Attesting Officer*

*Commissioner of Patents and Trademarks*